Figure 1:
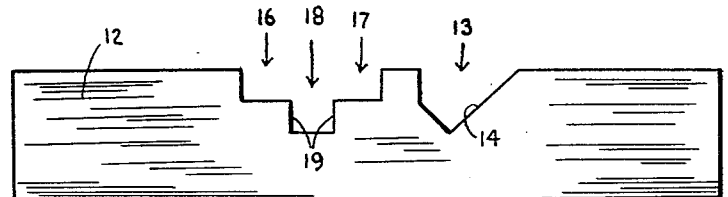

May 17, 1955 T. P. WARNE 2,708,317
POCKET LEVEL
Filed July 28, 1951

INVENTOR.
THOMAS P. WARNE

United States Patent Office 2,708,317
Patented May 17, 1955

2,708,317
POCKET LEVEL
Thomas P. Warne, Houston, Pa.

Application July 28, 1951, Serial No. 239,195

2 Claims. (Cl. 33—207)

The present invention relates to a pocket level and it consists in the combinations, constructions and arrangements of parts herein described and claimed.

Generally there is provided a pocket level which may be conveniently carried in the user's pocket. The device consists of a bubble level of glass mounted in a relatively small metal casing which casing is, in turn, adapted to be positioned in various positions in openings provided in the side of a relatively large housing so that the large housing may be utilized as a level for the reading of horizontal, vertical and 45° angles. The bubble casing is selectively placed in the openings provided in the larger housing and but one bubble level is required for the device and, if broken, may be easily and economically replaced.

It is accordingly an object of the invention to provide a device of the character set forth which is simple in construction, inexpensive to manufacture and yet effective and efficient in use.

Another object of the invention is to provide a novel pocket level of the character set forth.

Figure 2:
Figure 3:
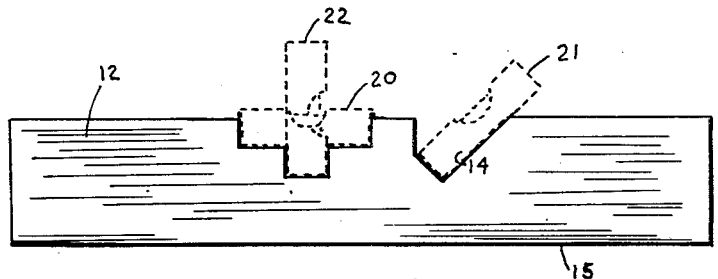

Other and further objects of the invention will become apparent from a reading of the following specification taken in conjunction with the drawing, in which:

Figure 1 is a side elevational view of a portion of the apparatus forming a part of the present invention, Figure 2 is a side elevational view of the bubble level and its casing which form parts of the invention, and Figure 3 is a side elevational view of the body of the device illustrated in Figure 1 together with dotted line showings of the various positions the bubble level of Figure 2 may assume therein.

Referring more particularly to the drawing, there is shown therein a bubble level 10 which may be formed of glass and which is mounted in a casing 11 of metal, such casing being preferably magnetized.

In Figure 1 there is shown the main body 12 of the device which is generally rectangular in shape and which is provided upon one of its longer sides with a cut off portion 13 having one side 14 thereof disposed at an angle of 45° to the opposite elongated side of the body 12, indicated at 15, which side 15 may be utilized as a straight edge.

There is also provided a cut out portion 16 having its inner side 17 in parallel relation to the edge 15 and, centrally cut from the cut away portion 16, there is provided a cut out portion 18 whose sides 19 are perpendicular to the edge 15.

In operation, it will be apparent that when it is desired to utilize the device as an ordinary level, it is only necessary to place the casing 11 in the position indicated at 20 in Figure 3, that is to say within the opening 16 so that the longer sides of the casing 11 are parallel to the sides 15 of the body 12 thus making the device a normal level which indicated with the side 15 a horizontal condition when the bubble of the bubble level 10 is centered. When it is desired to be utilized as an indicator of a 45° angle with respect to the horizontal, the casing 11 may be placed in the opening 13 so that its longer side will rest against the side 14, as indicated at 21 in Figure 3. In this condition, when the bubble is centered in the bubble level 10 the side 15 of the body 12 will be disposed at an angle of 45° to the horizontal.

When it is desired to utilize the device to indicate a vertical or plumb line, it is only necessary to place the casing 11 in the position shown at 22 in Figure 3, that is to say with its end within the opening 18 and its longer sides abutting the sides 19. In this position, when the bubble of the bubble level 10 is centered, the side 15 of the body 12 will be in a true vertical position. It will also be apparent that since the casing 11 is of magnetized metal, it will magnetically adhere to the body 12 when placed in any of the selected positions in the openings 13, 16 and 18, respectively.

While but one form of the invention has been shown and described herein, it will be readily apparent to those skilled in the art that many minor modifications may be made without departing from the spirit of the invention or the scope of the appended claims.

What is claimed is:

1. In a leveling device, an elongated rectangular body having a straight edge on its bottom side, the upper side of the body having a rectangular cut-out portion with a bottom parallel to the straight edge, and a casing having a bubble level therein and a bottom constructed to engage the bottom of said cut-out portion, said upper side of the body having a second cut-out portion with a bottom parallel to the straight edge and constructed to engage an end of the casing, said body having a third cut-out portion with sides at right angles to each other and at an angle of 45° to said straight edge and constructed to engage end and bottom sides of said casing, the ends of the casing being flat and at right angles to the bottom of the casing.

2. The structure set forth in claim 1 further characterized by said body and casing being magnetized.

References Cited in the file of this patent

UNITED STATES PATENTS

| Number | Name | Date |
|---|---|---|
| 804,067 | Stowe | Nov. 7, 1905 |
| 807,873 | Sharp | Dec. 19, 1905 |
| 1,066,013 | Henning | July 1, 1913 |
| 1,262,038 | Gould | Apr. 9, 1918 |
| 1,617,937 | Baucher et al. | Feb. 15, 1927 |
| 1,894,870 | Hutchens | Jan. 17, 1933 |
| 2,133,605 | Wikstrom | Oct. 18, 1938 |
| 2,414,653 | Lookholder | Jan. 21, 1947 |
| 2,535,791 | Fluke | Dec. 26, 1950 |
| 2,553,668 | Marello | May 22, 1951 |
| 2,572,514 | Phelon | Oct. 23, 1951 |

OTHER REFERENCES

Publ.: Modern Plastics, April 1945, pages 122 and 123.